United States Patent
Subramanian et al.

(10) Patent No.: US 10,481,901 B2
(45) Date of Patent: Nov. 19, 2019

(54) SYSTEM AND METHOD FOR PERFORMING FIRMWARE UPDATE BY PATCHING

(71) Applicant: AMZETTA TECHNOLOGIES, LLC, Norcross, GA (US)

(72) Inventors: Yugender P. Subramanian, Norcross, GA (US); Balasubramanian Chandrasekaran, Chennai (IN); David Yoon, Atlanta, GA (US); Manikandan Ganesan Malliga, Dindigul (IN)

(73) Assignee: AMZETTA TECHNOLOGIES, LLC, Norcross, GA (US)

( * ) Notice: Subject to any disclaimer, the term of this patent is extended or adjusted under 35 U.S.C. 154(b) by 0 days.

(21) Appl. No.: 15/495,312

(22) Filed: Apr. 24, 2017

(65) Prior Publication Data

US 2018/0307479 A1  Oct. 25, 2018

(51) Int. Cl.
*G06F 9/44* (2018.01)
*G06F 8/658* (2018.01)
*G06F 8/654* (2018.01)

(52) U.S. Cl.
CPC .............. *G06F 8/658* (2018.02); *G06F 8/654* (2018.02)

(58) Field of Classification Search
CPC .......... G06F 8/654; G06F 8/658; G06F 8/665; G06F 8/68; G06F 17/30371
USPC ................................................. 717/168–178
See application file for complete search history.

(56) References Cited

U.S. PATENT DOCUMENTS 6,976,163 B1 * 12/2005 Hind ..................... G06F 21/572 713/1
9,189,385 B2 * 11/2015 Cohen ................... G06F 3/0616
2010/0169709 A1 * 7/2010 Chiu ................... G06F 11/1004 714/16
2016/0291967 A1 * 10/2016 Badri ....................... G06F 8/658
2017/0090909 A1 * 3/2017 Guo .......................... G06F 8/66

OTHER PUBLICATIONS

Intel, "Intel® Firmware Support Package—External Architecture Specification", Version 1.1a, Nov. 2015, Intel Corporation, 51 pages.*

Jiming Sun et al., "Embedded Firmware Solutions—Development Best Practices for the Internet of Things", 2015, Apress Open, 177 pages.*

* cited by examiner

*Primary Examiner* — Ted T. Vo
(74) *Attorney, Agent, or Firm* — Locke Lord LLP; Tim Tingkang Xia, Esq.

(57) ABSTRACT

Systems and methods for performing firmware update on an embedded system by patching. In operation, a computing device may receive an image of replacement firmware, which is a different version of current firmware stored in a non-volatile memory of the embedded system. The computing device then determines the different portions of the replacement firmware from the current firmware by comparing the image of the replacement firmware to the current firmware, and retrieves the different portions from the image of the replacement firmware to form the fragments. In this case, the computing device may create a patch file by data of the fragments, and send the patch file to the embedded system, such that the embedded system may use the patch file to update the current firmware. The size of the patch file would be relatively smaller than the firmware image, thereby reducing update time and resources consumption.

20 Claims, 8 Drawing Sheets

SYSTEM AND METHOD FOR PERFORMING FIRMWARE UPDATE BY PATCHING

FIELD

The present disclosure relates generally to firmware update technology, and more particularly to systems and methods for performing firmware update on an embedded system, such as a controller or a system on chips, by patching.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Firmware, sometimes also referred to as system software, is the collective software that runs directly on an embedded system, such as an embedded controller or a system on a chip (SoC). System software can also run on standard processors, but they always tend to have a small footprint, such as a few megabytes (with some exceptions). The firmware image is usually stored in the non-volatile memory of the embedded system, such as a read-only memory (ROM) or a flash memory.

Typically, updating firmware may involve programming the entire image of the firmware. However, the non-volatile memory is optimized for reading operations rather than writing operations. Thus, write cycles for the non-volatile memory are several times slower than the read cycles. In this case, updating the entire image of the firmware may range from a few seconds to a few minutes, depending upon the size of the non-volatile memory. During the firmware updating process, the embedded system is under a critical stage, and having the system to go through the critical stage for prolonged time is very risky. If anything interrupts the firmware update, the embedded system can be rendered unusable. Further, to updating the whole firmware image, the entire new image has to be supplied to the embedded system. Transmitting the entire new image to the embedded system may consume memory space and addition time. Also, if the firmware image is sent to the embedded system through out-of-band routes, the transmission may consume network bandwidth.

Therefore, an unaddressed need exists in the art to address the aforementioned deficiencies and inadequacies.

SUMMARY

Certain aspects of the disclosure direct to a system, which includes: a computing device, including a processor and a storage device storing computer executable code; and an embedded system communicatively connected to the computing device and including a non-volatile memory storing current firmware. In certain embodiments, the computer executable code, when executed at the processor, is configured to: receive an image of replacement firmware, wherein the replacement firmware is a different version of the current firmware of the embedded system; determine at least one different portion of the replacement firmware from the current firmware by comparing the image of the replacement firmware to the current firmware; retrieve the at least one different portion from the image of the replacement firmware to form at least one fragment; create a patch file by data of the at least one fragment; transmit the patch file to the embedded system; and control the embedded system to update of the current firmware using the patch file.

Certain aspects of the disclosure direct to a method for performing firmware update on an embedded system by patching, including: receiving, by a computing device, an image of replacement firmware, wherein the embedded system is communicatively connected to the computing device, and the replacement firmware is a different version of current firmware stored in a non-volatile memory of the embedded system; determining, by the computing device, at least one different portion of the replacement firmware from the current firmware by comparing the image of the replacement firmware to the current firmware; retrieving, by the computing device, the at least one different portion from the image of the replacement firmware to form at least one fragment; creating, by the computing device, a patch file by data of the at least one fragment; transmitting, by the computing device, the patch file to the embedded system; and controlling, by the computing device, the embedded system to update of the current firmware using the patch file.

Certain aspects of the disclosure direct to a non-transitory computer readable medium storing computer executable code. The computer executable code, when executed at a processor of a computing device, is configured to: receive an image of replacement firmware, wherein the replacement firmware is a different version of current firmware stored in a non-volatile memory of an embedded system, and the embedded system is communicatively connected to the computing device; determine at least one different portion of the replacement firmware from the current firmware by comparing the image of the replacement firmware to the current firmware; retrieve the at least one different portion from the image of the replacement firmware to form at least one fragment; create a patch file by data of the at least one fragment; transmit the patch file to the embedded system; and control the embedded system to update of the current firmware using the patch file.

In certain embodiments, the embedded system is an embedded controller or a system on a chip (SoC).

In certain embodiments, the patch file includes: a patch header; a fragment header for each of the at least one fragment; and the data of the at least one fragment.

In certain embodiments, the patch header includes: patch version information of the patch header; new firmware version information of the replacement firmware; old firmware version information of the current firmware; product identification of the embedded system; vendor identification of the embedded system; a total size of the patch file; a total number of the at least one fragment in the patch file; and a patch checksum value for the patch file.

In certain embodiments, the embedded system is configured to perform update of the current firmware using the patch file by: determining whether the patch file is supported by checking the patch version information of the patch header; determining whether the old firmware version information of the patch header matches version information of the current firmware; performing an overall checksum verification using the patch checksum value for the patch file; verifying the product identification and the vendor identification; and replacing corresponding portions of the current firmware using the data of the at least one fragment.

In certain embodiments, for each of the at least one fragment, the fragment header includes: fragment version information of the fragment header; a fragment identification number of the fragment; a start address of the fragment; a size of the fragment; and a fragment checksum value for the fragment.

In certain embodiments, the embedded system is configured to replace each of the corresponding portions of the current firmware using the data of the at least one fragment by: retrieving the fragment header of the fragment corresponding to the portion of the current firmware to be replaced; determining whether the fragment is supported by checking the fragment version information of the fragment header; performing a fragment checksum verification using the fragment checksum value for the fragment; determining, among sector blocks of the non-volatile memory, at least one sector block to be replaced by the data of the fragment using the start address and the size of the fragment; and updating data of the at least one sector block using the data of the fragment.

In certain embodiments, the embedded system is configured to determine the at least one sector block to be replaced by the data of the fragment by: determining a start sector block of the non-volatile memory using the start address of the fragment; determining a block number of the fragment using the size of the fragment; and determining the at least one sector block to be replaced by the block number and the start sector block.

In certain embodiments, the embedded system is configured to update data of the at least one sector block using the data of the fragment by: copying the data of the at least one sector block to a volatile memory; replacing the copy of the data in the volatile memory using the data of the fragment; erasing the at least one sector block in the non-volatile memory; and writing the replaced copy of the data into the erased at least one sector block.

In certain embodiments, each of the sector blocks of the non-volatile memory comprises at least one sector.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

Certain embodiments of the present disclosure relate to computer technology. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As discussed above, updating firmware may typically involve programming the entire image of the firmware. However, flashing the entire firmware image would be time consuming, which increases the risk of having the system to go through the critical stage for prolonged time. Further, to updating the whole firmware image, the entire new image has to be supplied to the embedded system. Transmitting the entire new image to the embedded system may consume memory space and addition time. Also, if the firmware image is sent to the embedded system through out-of-band routes, the transmission may consume network bandwidth. For example, assuming the size of a firmware image is 256 MB, and the time to perform flashing of the entire 256 MB data of the firmware image is about 10 minutes. To send the entire firmware image to the embedded system, a user may use a local storage to send the entire 256 MB data in-band. Alternatively, the user may use a remote storage to store the entire 256 MB data, and to send the entire 256 MB of data out-of-band to the embedded system. In the transmission process, it is possible that network congestion may occur because of the large size of the entire firmware image. Further, once the entire firmware image is sent to the embedded system, the flashing time of the entire 256 MB data of the firmware image, which is about 10 minutes, must be consumed.

In order to reduce the time, size and bandwidth requirement for the firmware update, certain aspects of the present disclosure provides a solution for performing firmware update on an embedded computing device by patching. In particular, a patch file may be generated or created by the different portions between the replacement firmware image (e.g., the new firmware) and the current firmware image (e.g., the old firmware to be replaced). Since the patch file contains only the difference between the firmware, the patch size may be significantly reduced. For example, in the case that the size of an entire firmware image is 256 MB, the patch file may be only 1 MB, and the time to perform flashing of the 1 MB data of the patch file may be about a few seconds, which is significantly reduced from the 10 minutes required for flashing the entire firmware image. Transmission of the patch file may also be easier due to the reduced size.

Figure 1:
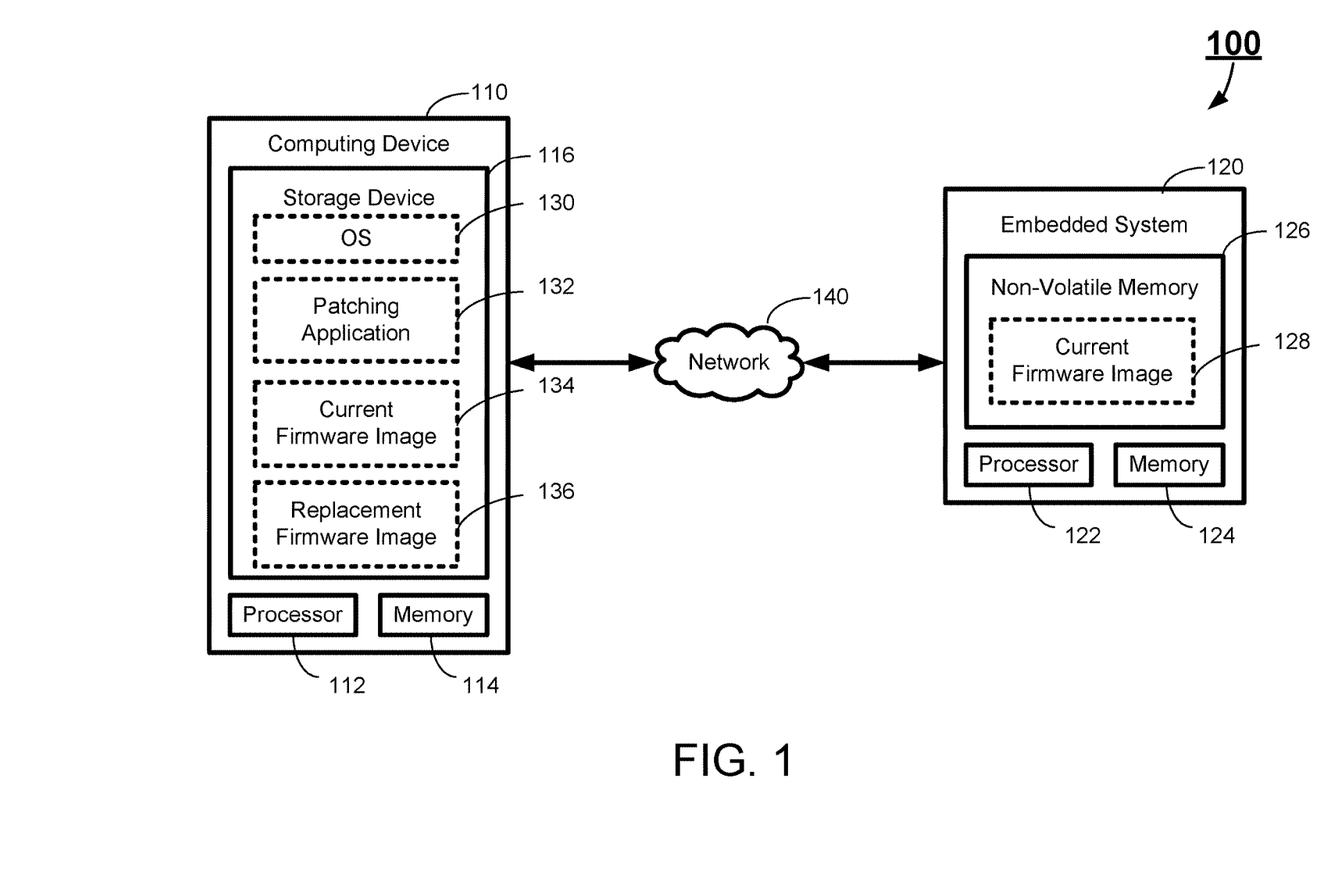
FIG. 1 schematically depicts a system according to certain embodiments of the present disclosure.

FIG. 1 schematically depicts a system according to certain embodiments of the present disclosure. In certain embodiments, the system 100 has a client-server structure. As shown in FIG. 1, the system 100 includes a computing device 110 and an embedded system 120 communicatively connected to the computing device 110 via a network 140. In certain embodiments, the network 140 may be a wired or wireless network, and may be of various forms. Examples of the network 140 may include, but is not limited to, a local area network (LAN), a wide area network (WAN) including the Internet, or any other type of networks. In certain embodiments, the computing device 110 and the embedded system 120 may be connected using other types of interfaces or buses. In certain embodiments, the system 100 is a client-server system, in which the computing device 110 functions as a server of the system 100, and the embedded system 120 functions as a client of the system 100.

The computing device 110 is a computing device to process the firmware images and generate the patch file. In certain embodiments, the computing device 110 may function as a server of the system 100, which provides of resources or services for the embedded system 120, i.e., the client of the system 100. In certain embodiments, the system 100 may include more than one computing device 110, which functions as one or more servers.

The embedded system 120 is an embedded computing device, such as an embedded controller or a SoC. In certain embodiments, the embedded system 120 is a device functioning as a client of the system 100. In certain embodiments, the system 100 may include multiple embedded systems 120, and the computing device 110 may be used to process firmware images for all of the embedded systems 120 to generate the patch files for each of the embedded system 120. For example, if all of the embedded systems 120 have the same version of firmware, the computing device 110 may generate one patch file for all of the embedded systems 120. In certain embodiments, each of the embedded systems 120 may have firmware of different versions, and the computing device 110 must generate different patch files for each of the embedded systems 120 having a different version of the firmware.

As shown in FIG. 1, the computing device 110 includes a processor 112, a memory 114, and a storage device 116. Further, the embedded system 120 includes a processor 122, a memory 124, and a non-volatile memory 126. In certain embodiments, the computing device 110 and the embedded system 120 may respectively include other hardware components and software components (not shown) to perform their corresponding tasks. For example, the computing device 110 may include, but not limited to, other required memory, interfaces, buses, Input/Output (I/O) modules, network interface cards (NICs) and peripheral devices. Similarly, the embedded system 120 may include other required memory, interfaces, buses, I/O modules, and NICs.

The processor 112 is configured to control operation of the computing device 110. Similarly, the processor 122 is configured to control operation of the embedded system 120. In certain embodiments, each of the processors 112 and 122 may be a central processing unit (CPU). The processor 112 can execute any computer executable code or instructions, and/or other applications and instructions of the computing device 110. The processor 122 can execute any computer executable code or instructions, such as the firmware 128, and/or other applications and instructions of the embedded system 120. In certain embodiments, each of the computing device 110 and the embedded system 120 may respectively run on more than one processor, such as two processors, four processors, eight processors, or any suitable number of processors.

The memory 114 and 124 can each be a volatile memory, such as the random-access memory (RAM), for storing the data and information during the operation of the computing device 110 and the embedded system 120, respectively. In certain embodiments, the memory 114 and 124 may each be a volatile memory array. In certain embodiments, each of the computing device 110 and the embedded system 120 may respectively run on more than one memory 114/124.

The storage device 116 is a non-volatile data storage media for storing the computer executable code or instructions and other necessary data of the computing device 110. Similarly, the non-volatile memory 126 is a non-volatile data storage media for storing the computer executable code or instructions and other necessary data of the embedded system 120. In certain embodiments, the computer executable code or instructions of the computing device 110 and the embedded system 120 may be implemented as one or more application programs or modules. Examples of the storage device 116 and/or the non-volatile memory 126 may include non-volatile memory such as flash memory, memory cards, hard drives, floppy disks, optical drives, or any other types of data storage devices. In certain embodiments, the computing device 110 may have multiple storage devices 116, which may be identical storage devices or different types of storage devices, and the computer executable code or instructions of the computing device 110 may be stored in one or more of the storage devices 116 of the computing device 110. Similarly, the embedded system 120 may have multiple non-volatile memory 126, which may be identical storage devices or different types of storage devices, and the computer executable code or instructions of the embedded system 120 may be stored in one or more of the non-volatile memory 126 of the embedded system 120.

As shown in FIG. 1, the computer executable code and applications stored in the storage device 116 of the computing device 110 may include an operating system (OS) 130 and a patching application 132, and the computer executable code and applications stored in the non-volatile memory 126 of the embedded system 120 may include a current firmware image 128. In certain embodiments, the storage device 116 may further store a copy of the current firmware image 134 and a copy of a replace firmware image 136.

The OS 130 includes a set of functional programs that control and manage operations of the computing device 110. In certain embodiments, the OS 130 may receive and manage the simulated signals from components of the computing device 110. The OS 130 may not realize that it is running on virtual machine and may perceive that it is running on a physical machine. In certain embodiments, the OS 130 is operable to multitask, i.e., execute computing tasks in multiple threads. In certain embodiments, the OS 130 may be any of the following: MICROSOFT CORPORATION's "WINDOWS 95," "WINDOWS CE," "WINDOWS 98," "WINDOWS 2000," "WINDOWS NT," "WINDOWS Vista," "WINDOWS 7," "WINDOWS 8," "WINDOWS 10" operating systems, IBM's OS/2 WARP, APPLE's MACINTOSH OSX operating system, LINUX, UNIX, or any other operating systems.

The patching application 132 is a software application to perform patching of the firmware images. For example, the patching application 132 may compare the replacement firmware image 136 to the current firmware image 134, and determine one or more different portions of the replacement firmware image 136 from the current firmware image 134. In this way, the patching application 132 may retrieve the different portions from the replacement firmware image 136 to form a plurality of fragments, and use the fragments to create a patch file.

Figure 2:
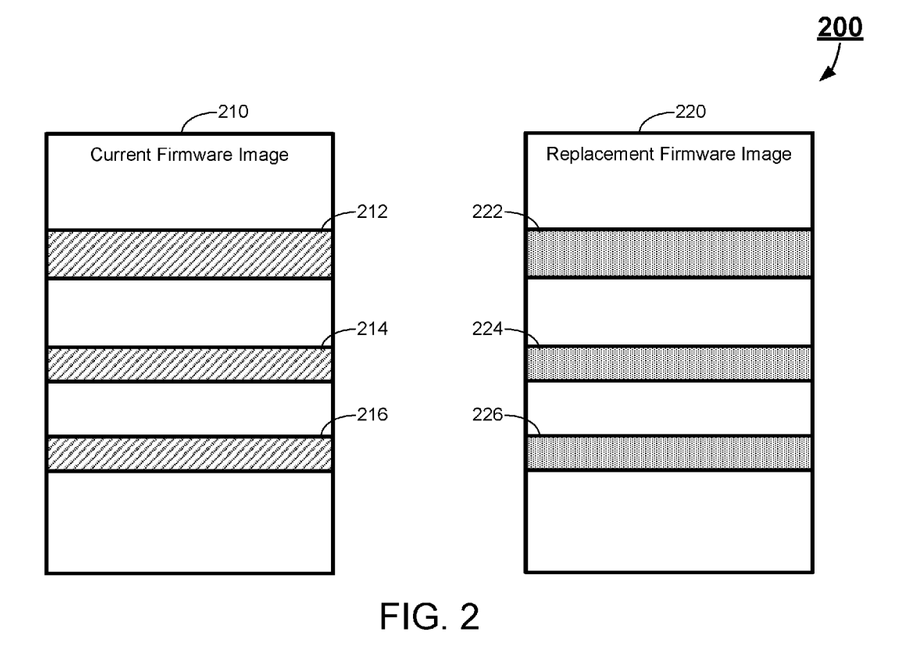
FIG. 2 schematically depicts comparison of a current firmware image and a replacement firmware image according to certain embodiments of the present disclosure.

FIG. 2 schematically depicts comparison of a current firmware image and a replacement firmware image according to certain embodiments of the present disclosure. As shown in FIG. 2, a comparison of a current firmware image 210 and a replacement firmware image 220 may be performed by comparing the data of the current firmware image 210 with the corresponding data of the replacement firmware image 220, and identify the different portions (212 vs 222, 214 vs 224, and 216 vs 226) of data between the firmware images.

In certain embodiments, the patching application 132 may perform the comparison of the current firmware image 210 and the replacement firmware image 220 on a sector basis or a "block" basis. In particular, since the firmware image is supposed to be stored in the non-volatile memory 126 of the embedded system 120, comparison of the firmware images may be conducted based on the most commonly used unit of the non-volatile memory 126. In certain embodiments, when a flash memory is used as the non-volatile memory 126, the flash memory is divided into multiple "blocks," where each block can vary in size, where the most common is 128 KB. In certain embodiments, the size of a block may vary, and each of the blocks would include at least one sector. In certain embodiments, in the majority of NAND flash devices, each block is made of 64 pages of 2 KB each. A page is divided in two regions: the data area, and the spare area used for memory management purposes. Pages are divided in sector units (or chunks) of 512 byte to emulate the popular sector size (ibid). The block is the smallest erasable unit while the page is the smallest programmable unit. In certain embodiments, a block can have a size of 128K (=131072) bytes. In an erasing or rewriting operation, data in one block must be erased before new data can be rewritten to any sector of the block. It should be noted that the sizes of the portions 222, 224 and 226 may vary, and each portion 222, 224 and 226 may occupy the memory space which is greater than 128K bytes (i.e., the size of one block).

Figure 3:
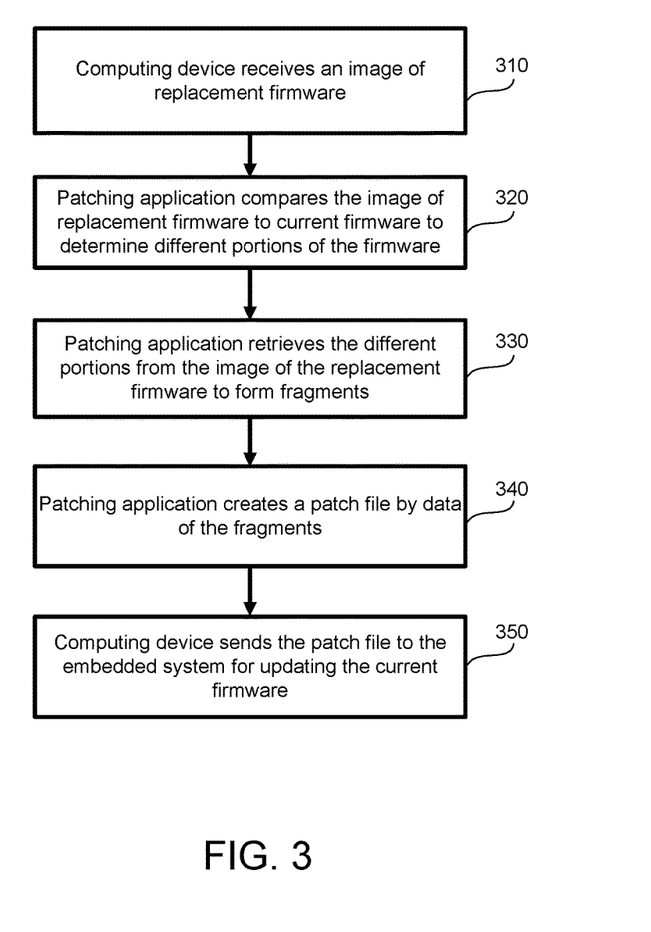
FIG. 3 depicts a flowchart of the operation of the patching application according to certain embodiments of the present disclosure.

FIG. 3 depicts a flowchart of the operation of the patching application according to certain embodiments of the present disclosure. In certain embodiments, the operation of the patching application may be implemented by the computing device 110 of the system 100 as shown in FIG. 1. It should be particularly noted that, unless otherwise stated in the present disclosure, the steps of the operation may be arranged in a different sequential order, and are thus not limited to the sequential order as shown in FIG. 3.

As shown in FIG. 3, at procedure 310, the computing device 110 may receive the replacement firmware image 136, which is a different version (typically a newer version) of the current firmware image 128 of the embedded system 120. At procedure 320, the patching application 132 compares the image of replacement firmware to current firmware to determine different portions of the firmware, as shown in FIG. 2.

Figure 4:
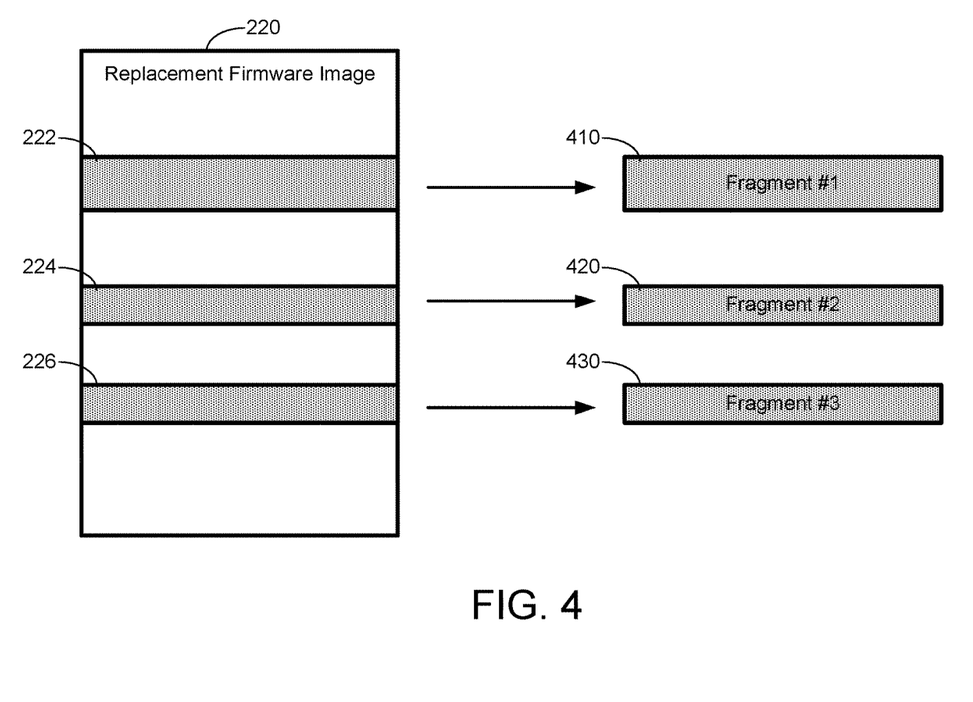
FIG. 4 schematically depicts the operation of retrieving the different portions from the replacement firmware image to form the fragments according to certain embodiments of the present disclosure.

Once the different portions of the firmware are determined, at procedure 330, the patching application 132 may retrieve the different portions from the replacement firmware image 136 to form fragments. For example, FIG. 4 schematically depicts the operation of retrieving the different portions from the replacement firmware image to form the fragments according to certain embodiments of the present disclosure. As shown in FIG. 4, when the different portions 222, 224 and 226 of the replacement firmware image 220 are obtained by comparison as shown in FIG. 2, the different portions 222, 224 and 226 may be retrieved to form the fragments 410, 420 and 430.

Referring back to FIG. 3, when the patching application 132 generates the fragments, at procedure 340, the patching application 132 may create a patch file using the data of the fragments. In certain embodiments, the patch file may include a patch header; a fragment header for each of the fragments; and the data of the fragments.

Figure 5A:
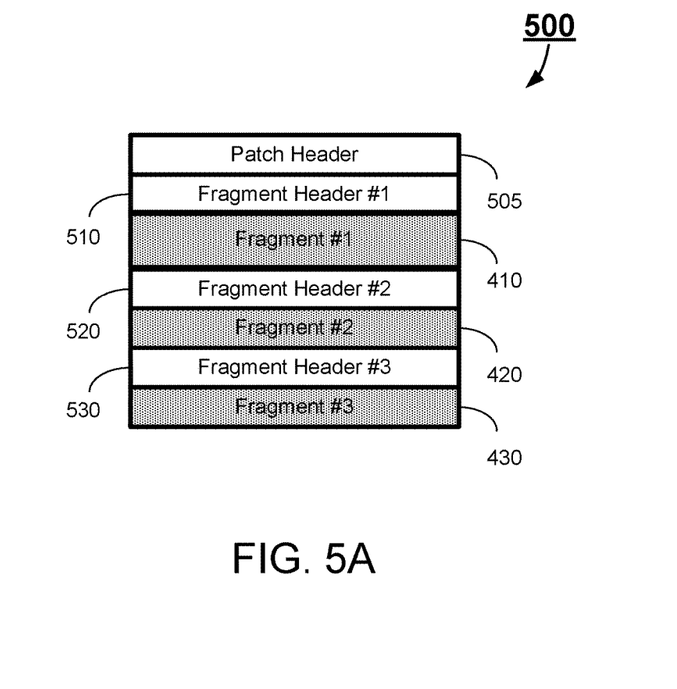
FIG. 5A schematically depicts an exemplary patch file according to certain embodiments of the present disclosure.

FIG. 5A schematically depicts an exemplary patch file according to certain embodiments of the present disclosure. As shown in FIG. 5A, the patch file 500 includes a patch header 505, a fragment header #1 510, a fragment #1 410, a fragment header #1 520, a fragment #2 420, a fragment header #3 530, a fragment #3 430. In particular, each of the fragments has a corresponding fragment header immediately before the data of the fragment. In certain embodiments, the patch file may include other data that may be necessary for the firmware update process.

Figure 5B:
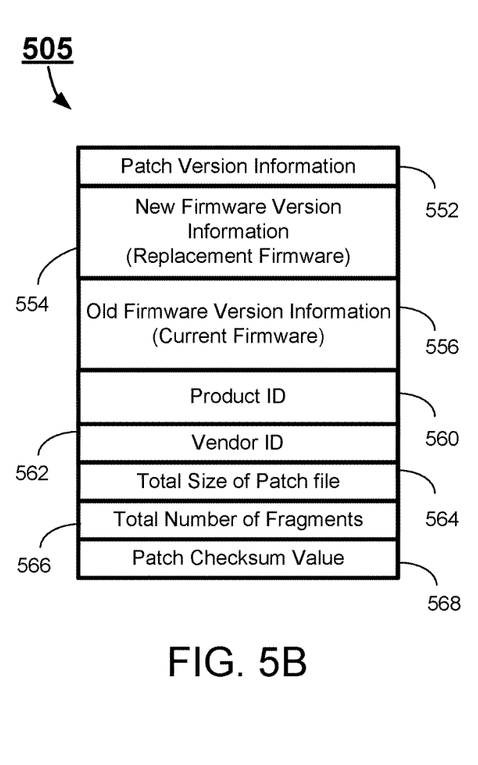
FIG. 5B schematically depicts an exemplary data structure of the patch header of the patch file according to certain embodiments of the present disclosure.

In certain embodiments, the patch header 505 may include information that allows the embedded system 120 to verify the patch file 500. For example, FIG. 5B schematically depicts an exemplary data structure of the patch header of the patch file according to certain embodiments of the present disclosure. As shown in FIG. 5B, the patch header 505 includes patch version information 552 of the patch header 505; new firmware version information 554 of the replacement firmware; old firmware version information 556 of the current firmware; product identification 560 and vendor identification 562 of the embedded computing device; a total size 564 of the patch file 500; a total number of the fragments 566 in the patch file 500; and a patch checksum value 568 for the patch file 500. In certain embodiments, the patch header 505 may include other data that may be necessary for identifying and verifying the patch file 500. It should be noted that all the data or information of the patch header 505 may be arranged in a different sequential order, and may be thus not limited to the sequential order as shown in FIG. 5B.

Figure 5C:
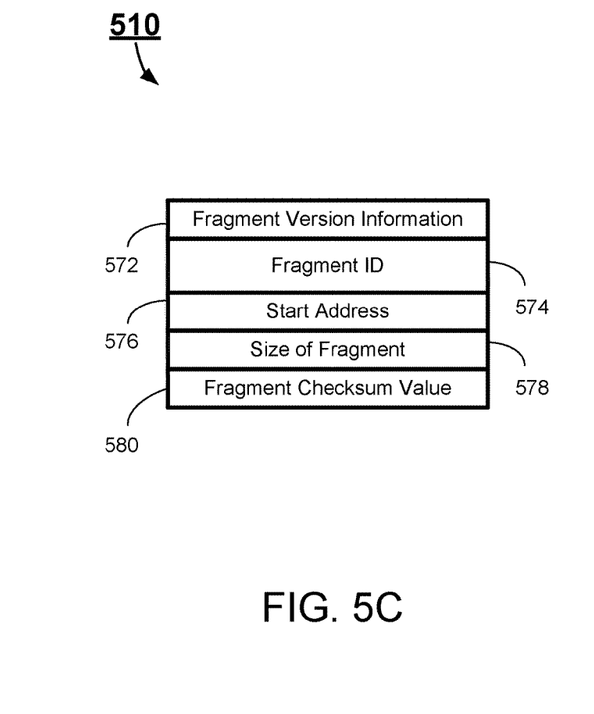
FIG. 5C schematically depicts an exemplary data structure of a fragment header of the patch file according to certain embodiments of the present disclosure.

In certain embodiments, each of the fragment headers 510, 520 and 530 may include information that allows the embedded system 120 to identify and verify the corresponding fragments 410, 420 and 430. For example, FIG. 5C schematically depicts an exemplary data structure of a fragment header of the patch file according to certain embodiments of the present disclosure. Specifically, the fragment header #1 510, which corresponds to the fragment #1 410, is shown in FIG. 5C as an example of the fragment header, and other fragment headers 520 (#2) and 530 (#3) may have similar data structures. As shown in FIG. 5C, the fragment header #1 510 includes fragment version information 572 of the fragment header 510; a fragment ID 574 (e.g., a number "#1") of the corresponding fragment #1; a start address 576 of the corresponding fragment #1; a size 578 of the corresponding fragment #1; and a fragment checksum value 580 for the corresponding fragment #1. In certain embodiments, the fragment header 510 may include other data that may be necessary for identifying and verifying the corresponding fragment #1. It should be noted that all the data or information of the fragment header 510 may be arranged in a different sequential order, and may be thus not limited to the sequential order as shown in FIG. 5C.

It should be particularly noted that the patch file 500, the patch header 505, and the fragment header 510 as shown in FIGS. 5A-5C are provided for illustration purposes only. In certain embodiments, the patch header 505 and the fragment header 510 may have any type and number of relevant fields as required based on implementation. Similarly, verification procedures such as checksum verification can be implemented in any possible ways.

Referring back to FIG. 3, once the patch file 500 is created, at procedure 350, the computing device 110 may send the patch file to the embedded system 120 for updating the current firmware 128. Thus, the computing device 110 may control the embedded system 120 to update of the current firmware 128 using the patch file 500. Alternatively, an administrator may manually control the embedded system 120 to update of the current firmware 128 using the patch file 500.

Figure 6A:
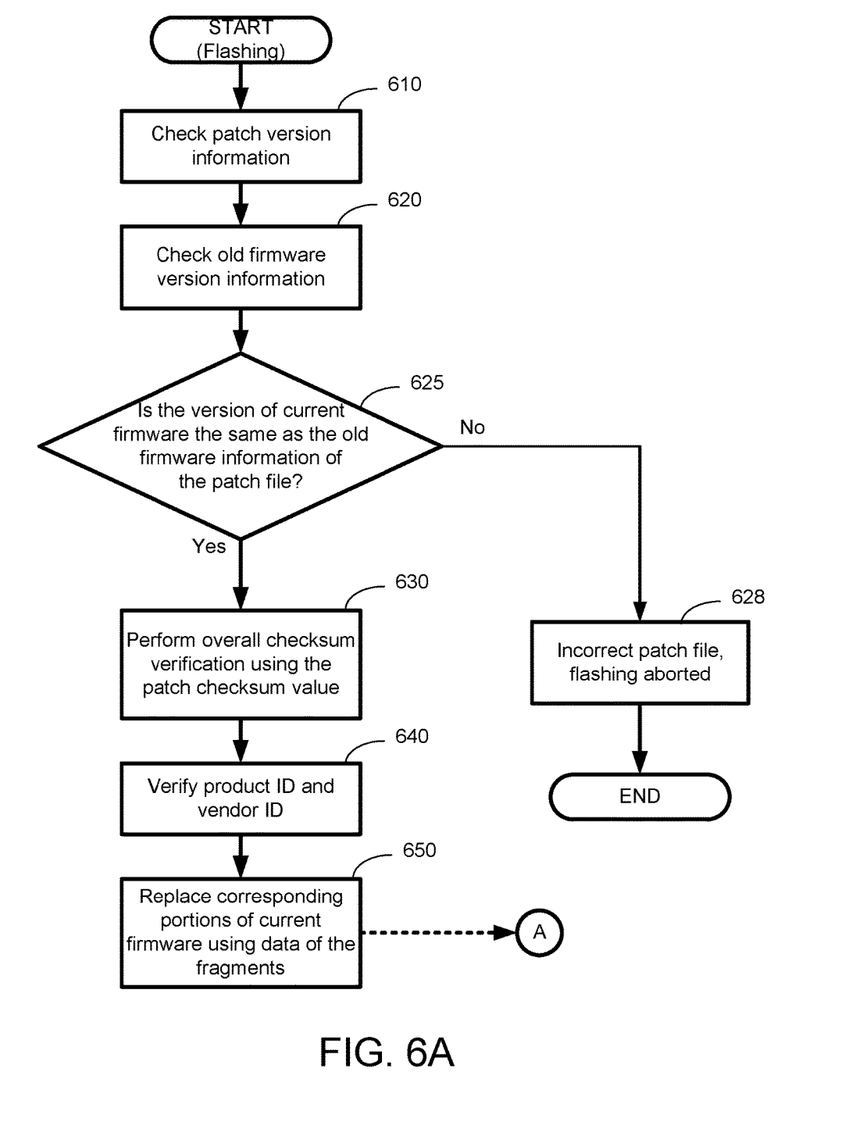
FIGS. 6A and 6B depict a flowchart for performing firmware update on an embedded system by patching according to certain embodiments of the present disclosure.
Figure 6B:
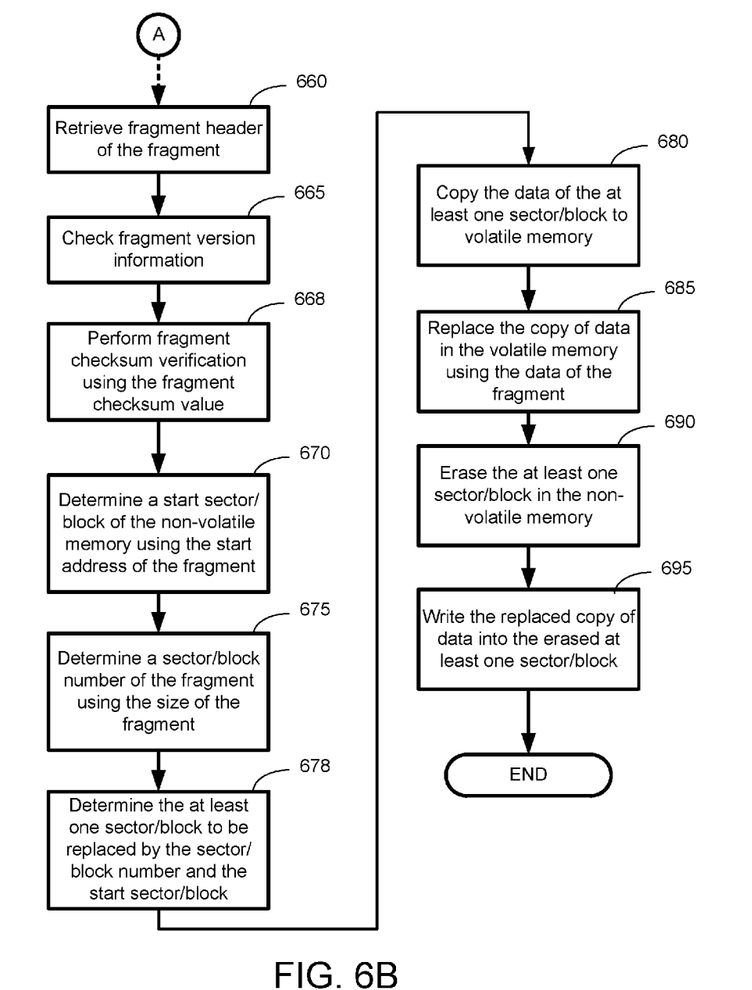

FIGS. 6A and 6B depict a flowchart for performing firmware update on an embedded system by patching according to certain embodiments of the present disclosure. In certain embodiments, the firmware update process may be implemented by the embedded system 120 of the system 100 as shown in FIG. 1, using a patch file 500 as shown in FIG. 5A that includes the information as shown in FIGS. 5B and 5C. It should be particularly noted that, unless otherwise stated in the present disclosure, the steps of the firmware update process may be arranged in a different sequential order, and are thus not limited to the sequential order as shown in FIGS. 6A and 6B.

As shown in FIG. 6A, at the start of the firmware update process, the embedded system 120 would perform a series of patch verification processes to verify the patch file 500 is indeed the correct and valid patch file for updating the current firmware image 128 of the embedded system 120. At procedure 610, the embedded system 120 may check the patch version information 552 of the patch header 505 in order to determine whether the patch file 500 is supported.

If the patch file 500 is corrupted or has a different data structure, the patch version information 552 may not indicate that the patch file is supported.

When the patch version information 552 indicates that the patch file is supported, the embedded system 120 then checks whether the patch file 500 is generated using the correct copy of the current firmware image 128. As discussed above, in certain embodiments, the system 100 may include multiple embedded systems 120, and the computing device 110 may be used to process firmware images for all of the embedded systems 120 to generate the patch files for each of the embedded system 120. Thus, there is no guarantee that the patch file 500 being received by the embedded system 120 is generated using the correct copy of the current firmware image 128. At procedure 620, the embedded system 120 checks the old firmware version information 554 of the patch header 505, and determines, at procedure 625, whether the old firmware version information 554 of the patch header 505 matches the version information of the current firmware image 128 of the embedded system 120. If the old firmware version information 554 of the patch header 505 matches the version information of the current firmware image 128, the embedded system 120 may proceed to procedure 630. If the old firmware version information 554 of the patch header 505 does not match the version information of the current firmware image 128, at procedure 628, the embedded system 120 may determine that the patch file 500 is an incorrect patch file, and stop the firmware flashing process.

At procedure 630, the embedded system 120 may then verify the data of the patch file 500 by performing an overall checksum verification using the patch checksum value 566 for the patch file 500. If the patch file 500 is corrupt, the overall checksum verification may fail, and the embedded system 120 may terminate the firmware flashing process. Then, at procedure 640, the embedded system 120 may verify the product ID 560 and the vendor ID 562.

Once the patch file 500 passes all of the patch verification processes, at procedure 650, the embedded system 120 may start replacing the corresponding portions of the current firmware image 128 using the data of the fragments in the patch file 500. In certain embodiments, the replacing process of each of the corresponding portions of the current firmware image 128 using the data of the fragment may be elaborated in detail with reference to FIG. 6B.

As shown in FIG. 6B, to replace a specific portion of the current firmware image 128 using the corresponding fragment (e.g., the fragment #1 410), at procedure 660, the embedded system 120 may retrieve the fragment header #1 510 of the fragment #1. Then, the embedded system 120 may perform a series of fragment verification procedures. At procedure 665, the embedded system 120 may check the fragment version information 572 of the fragment header 510 in order to determine whether the fragment #1 is supported. Then, at procedure 668, the embedded system 120 may then perform a fragment checksum verification using the fragment checksum value 580 for the fragment #1. If the fragment #1 is corrupt, the fragment checksum verification may fail, and the embedded system 120 may terminate the firmware flashing process.

Once the fragment #1 passes all of the fragment verification processes, the embedded system 120 may determine the sectors or the blocks to be replaced by the data of the fragment using the start address 576 and the size 578 of the fragment. At procedure 670, the embedded system 120 may determine a start sector block of the non-volatile memory 126 using the start address 576 of the fragment #1. In certain embodiments, the start address 576 is an offset value from 0x0 where the data of the fragment should be written. Then, at procedure 675, the embedded system 120 may determine, using the size 578 of the fragment #1, a sector/block number of the fragment. In certain embodiments, the embedded system may determine the sector/block number by dividing the size 578 of the fragment #1 by the size of a sector or a block. For example, if the size of the fragment #1 is 500 KB, and the size of a block is 128 KB, the fragment #1 would occupy 4 blocks. At procedure 678, the embedded system 120 may then determine the sector/block (or multiple sectors/blocks) to be replaced by the sector/block number and the start sector/block.

Upon determining the sectors or the blocks to be replaced, the embedded system 120 may then perform the actual updating/flashing process to replace the data in the sectors/blocks using the data of the fragment #1. As discussed above, the block is the smallest erasable unit of the non-volatile memory 126 (e.g., the flash memory). Thus, the data of the sectors/blocks must be erased before writing the data of the fragment into the erased sectors/blocks. At procedure 680, the embedded system 120 copies the data of the sectors/blocks to the volatile memory 124. The reason to copy the data of the sectors/blocks to the volatile memory 124 is that the data writing/updating process is much faster in the volatile memory 124. Then, at procedure 685, the embedded system 120 may replace the copy of data in the volatile memory 124 using the data of the fragment #1. Meanwhile, at procedure 690, the embedded system 120 may erase the sectors/blocks in the non-volatile memory 126. Once the sectors/blocks are erased, at procedure 695, the embedded system 120 may write the replaced copy of data into the erased sectors/blocks. In this way, the data replacing process of the sectors/blocks is accomplished.

It should be noted that, as shown in FIG. 6B, the procedures 660 to 695 involve replacing the data of a specific portion of the current firmware image 128 using the corresponding fragment #1. When the patch file 500 includes multiple fragments, the procedures 660 to 695 may be repeated for all fragments. When all portions of the current firmware image 128 have been replaced by the data of the fragments, the firmware updating process is complete.

In a further aspect, the present disclosure is related to a non-transitory computer readable medium storing computer executable code. The code, when executed at a processer of a controller, may perform the method as described above. In certain embodiments, the non-transitory computer readable medium may include, but not limited to, any physical or virtual storage media storing the firmware of the controller. In certain embodiments, the non-transitory computer readable medium may be implemented as the storage device 116 of the computing device 110 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a computing device, comprising a processor and a storage device storing computer executable code; and
an embedded system communicatively connected to the computing device, and comprising a non-volatile memory storing current firmware,
wherein the computer executable code, when executed at the processor, is configured to:
receive an image of replacement firmware, wherein the replacement firmware is a different version of the current firmware of the embedded system;
determine at least one different portion of the replacement firmware from the current firmware by comparing the image of the replacement firmware to the current firmware;
retrieve the at least one different portion from the image of the replacement firmware to form at least one fragment, wherein each of the at least one fragment corresponds to one of the at least one different portion retrieved from the image;
create a patch file by data of the at least one fragment;
transmit the patch file to the embedded system; and
configure the embedded system to:
copy corresponding portions of the current firmware from the non-volatile memory to a volatile memory;
replace the copy of the corresponding portions of the current firmware in the volatile memory with data of the at least one fragment;
erase the corresponding portions of the current firmware in the non-volatile memory; and
write the replaced copy of the corresponding portions of the current firmware in the volatile memory into the erased corresponding portions of the current firmware in the non-volatile memory.

2. The system of claim 1, wherein the embedded system is an embedded controller or a system on a chip (SoC).

3. The system of claim 1, wherein the patch file comprises:
a patch header;
a fragment header for each of the at least one fragment; and
the data of the at least one fragment.

4. The system of claim 3, wherein the patch header comprises:
patch version information of the patch header;
new firmware version information of the replacement firmware;
old firmware version information of the current firmware;
product identification of the embedded system;
vendor identification of the embedded system;
a total size of the patch file;
a total number of the at least one fragment in the patch file; and
a patch checksum value for the patch file.

5. The system of claim 4, wherein the embedded system is configured to:
determine whether the patch file is supported by checking the patch version information of the patch header;
determine whether the old firmware version information of the patch header matches version information of the current firmware;
perform an overall checksum verification using the patch checksum value for the patch file; and
verify the product identification and the vendor identification.

6. The system of claim 5, wherein for each of the at least one fragment, the fragment header comprises:
fragment version information of the fragment header;
a fragment identification number of the fragment;
a start address of the fragment;
a size of the fragment; and
a fragment checksum value for the fragment.

7. The system of claim 6, wherein the embedded system is configured to:
retrieve the fragment header of the fragment corresponding to the portion of the current firmware to be replaced;
determine whether the fragment is supported by checking the fragment version information of the fragment header;
perform a fragment checksum verification using the fragment checksum value for the fragment;
determine, among sector blocks of the non-volatile memory, at least one sector block to be replaced by the data of the fragment using the start address and the size of the fragment; and
update data of the at least one sector block using the data of the fragment.

8. The system of claim 7, wherein the embedded system is configured to determine the at least one sector block to be replaced by the data of the fragment by:
determining a start sector block of the non-volatile memory using the start address of the fragment;
determining a block number of the fragment using the size of the fragment; and
determining the at least one sector block to be replaced by the block number and the start sector block.

9. The system of claim 7, wherein the embedded system is configured to update data of the at least one sector block using the data of the fragment by:
copying the data of the at least one sector block from the non-volatile memory to a volatile memory;
replacing the copy of the data in the volatile memory using the data of the fragment;
erasing the at least one sector block in the non-volatile memory; and
writing the replaced copy of the data in the volatile memory into the erased at least one sector block in the non-volatile memory.

10. The system of claim 7, wherein each of the sector blocks of the non-volatile memory comprises at least one sector.

11. A method for performing firmware update on an embedded system by patching, comprising:
receiving, by a computing device, an image of replacement firmware, wherein the embedded system is communicatively connected to the computing device, and the replacement firmware is a different version of current firmware stored in a non-volatile memory of the embedded system;
determining, by the computing device, at least one different portion of the replacement firmware from the current firmware by comparing the image of the replacement firmware to the current firmware;
retrieving, by the computing device, the at least one different portion from the image of the replacement firmware to form at least one fragment, wherein each of the at least one fragment corresponds to one of the at least one different portion retrieved from the image;

creating, by the computing device, a patch file by data of the at least one fragment;
transmitting, by the computing device, the patch file to the embedded system; and
configuring, by the computing device, the embedded system to:
copy corresponding portions of the current firmware from the non-volatile memory to a volatile memory;
replace the copy of the corresponding portions of the current firmware in the volatile memory with data of the at least one fragment;
erase the corresponding portions of the current firmware in the non-volatile memory; and
write the replaced copy of the corresponding portions of the current firmware in the volatile memory into the erased corresponding portions of the current firmware in the non-volatile memory.

12. The method of claim 11, wherein the patch file comprises:
a patch header;
a fragment header for each of the at least one fragment; and
the data of the at least one fragment.

13. The method of claim 12, wherein the patch header comprises:
patch version information of the patch header;
new firmware version information of the replacement firmware;
old firmware version information of the current firmware;
product identification of the embedded system;
vendor identification of the embedded system;
a total size of the patch file;
a total number of the at least one fragment in the patch file; and
a patch checksum value for the patch file.

14. The method of claim 13, wherein the embedded system is configured to:
determine whether the patch file is supported by checking the patch version information of the patch header;
determine whether the old firmware version information of the patch header matches version information of the current firmware;
perform an overall checksum verification using the patch checksum value for the patch file; and
verify the product identification and the vendor identification.

15. The method of claim 14, wherein for each of the at least one fragment, the fragment header comprises:
fragment version information of the fragment header;
a fragment identification number of the fragment;
a start address of the fragment;
a size of the fragment; and
a fragment checksum value for the fragment.

16. The method of claim 15, wherein the embedded system is configured to:
retrieve the fragment header of the fragment corresponding to the portion of the current firmware to be replaced;
determine whether the fragment is supported by checking the fragment version information of the fragment header;
perform a fragment checksum verification using the fragment checksum value for the fragment;
determine, among sector blocks of the non-volatile memory, at least one sector block to be replaced by the data of the fragment using the start address and the size of the fragment; and
update data of the at least one sector block using the data of the fragment.

17. The method of claim 16, wherein:
the embedded system is configured to determine the at least one sector block to be replaced by the data of the fragment by:
determining a start sector block of the non-volatile memory using the start address of the fragment;
determining a block number of the fragment using the size of the fragment; and
determining the at least one sector block to be replaced by the block number and the start sector block;
the embedded system is configured to update data of the at least one sector block using the data of the fragment by:
copying the data of the at least one sector block from the non-volatile memory to a volatile memory;
replacing the copy of the data in the volatile memory using the data of the fragment;
erasing the at least one sector block in the non-volatile memory; and
writing the replaced copy of the data in the volatile memory into the erased at least one sector block in the non-volatile memory.

18. A non-transitory computer readable medium storing computer executable code, wherein the computer executable code, when executed at a processor of a computing device, is configured to:
receive an image of replacement firmware, wherein the replacement firmware is a different version of current firmware stored in a non-volatile memory of an embedded system, and the embedded system is communicatively connected to the computing device;
determine at least one different portion of the replacement firmware from the current firmware by comparing the image of the replacement firmware to the current firmware;
retrieve the at least one different portion from the image of the replacement firmware to form at least one fragment, wherein each of the at least one fragment corresponds to one of the at least one different portion retrieved from the image;
create a patch file by data of the at least one fragment;
transmit the patch file to the embedded system; and
configure the embedded system to:
copy corresponding portions of the current firmware from the non-volatile memory to a volatile memory;
replace the copy of the corresponding portions of the current firmware in the volatile memory with data of the at least one fragment;
erase the corresponding portions of the current firmware in the non-volatile memory; and
write the replaced copy of the corresponding portions of the current firmware in the volatile memory into the erased corresponding portions of the current firmware in the non-volatile memory.

19. The non-transitory computer readable medium of claim 18, wherein the patch file comprises:
a patch header, comprising:
patch version information of the patch header;
new firmware version information of the replacement firmware;

old firmware version information of the current firmware;
product identification of the embedded system;
vendor identification of the embedded system;
a total size of the patch file;
a total number of the at least one fragment in the patch file; and
a patch checksum value for the patch file;
a fragment header for each of the at least one fragment, the fragment header comprising:
fragment version information of the fragment header;
a fragment identification number of the fragment;
a start address of the fragment;
a size of the fragment; and
a fragment checksum value for the fragment; and
the data of the at least one fragment.

20. The non-transitory computer readable medium of claim 18, wherein the computer executable code is configured to:
determine whether the patch file is supported by checking the patch version information of the patch header;
determine whether the old firmware version information of the patch header matches version information of the current firmware;
perform an overall checksum verification using the patch checksum value for the patch file;
verify the product identification and the vendor identification;
retrieve the fragment header of the fragment corresponding to the portion of the current firmware to be replaced;
determine whether the fragment is supported by checking the fragment version information of the fragment header;
perform a fragment checksum verification using the fragment checksum value for the fragment;
determine, among sector blocks of the non-volatile memory, at least one sector block to be replaced by the data of the fragment using the start address and the size of the fragment; and
update data of the at least one sector block using the data of the fragment.

* * * * *